(12) United States Patent
An et al.

(10) Patent No.: US 10,390,050 B2
(45) Date of Patent: Aug. 20, 2019

(54) METHOD OF VIDEO CODING USING SEPARATE CODING TREE FOR LUMA AND CHROMA

(71) Applicant: MediaTek Singapore Pte. Ltd., Singapore (SG)

(72) Inventors: Jicheng An, Beijing (CN); Kai Zhang, Beijing (CN); Han Huang, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 18 days.

(21) Appl. No.: 15/524,384

(22) PCT Filed: Oct. 29, 2015

(86) PCT No.: PCT/CN2015/093156
§ 371 (c)(1),
(2) Date: May 4, 2017

(87) PCT Pub. No.: WO2016/074567
PCT Pub. Date: May 19, 2016

(65) Prior Publication Data
US 2018/0288446 A1     Oct. 4, 2018

(30) Foreign Application Priority Data

Nov. 11, 2014    (WO) ............. PCT/CN2014/090792

(51) Int. Cl.
*H04N 19/96*      (2014.01)
*H04N 19/70*      (2014.01)
(Continued)

(52) U.S. Cl.
CPC ........... *H04N 19/96* (2014.11); *H04N 19/159* (2014.11); *H04N 19/186* (2014.11); *H04N 19/70* (2014.11)

(58) Field of Classification Search
CPC .... H04N 19/96; H04N 19/159; H04N 19/186; H04N 19/70
(Continued)

(56) References Cited

U.S. PATENT DOCUMENTS 9,332,283 B2    5/2016  Chen et al.
9,426,485 B2    8/2016  Chono
(Continued)

FOREIGN PATENT DOCUMENTS

CN    102577380 A    7/2012
CN    103004201 A    3/2013
(Continued)

OTHER PUBLICATIONS

International Search Report dated Feb. 2, 2016, issued in application No. PCT/CN2015/093156.
(Continued)

*Primary Examiner* — Jamie J Atala
*Assistant Examiner* — James T Boylan
(74) *Attorney, Agent, or Firm* — McClure, Qualey & Rodack, LLP

(57) ABSTRACT

A method of video coding using separate coding trees for luma component and chroma component is disclosed. The luma component and the chroma component are allowed to have its own coding trees to partition the corresponding video data. In one embodiment, a first syntax element is used for each first node of the luma coding tree to indicate whether the first node is split and a separate second syntax element is used for each second node of the chroma coding tree to indicate whether the second node is split. For each CTU, the luma coding tree and the chroma coding tree are signaled using separate syntax elements. Furthermore, for
(Continued)

each CTU, the syntax elements for the luma coding tree can be signaled before the syntax elements for each chroma CTU.

17 Claims, 10 Drawing Sheets

(51) Int. Cl.
*H04N 19/186* (2014.01)
*H04N 19/159* (2014.01)

(58) Field of Classification Search
USPC .................................................. 375/240.12
See application file for complete search history.

(56) References Cited

U.S. PATENT DOCUMENTS

| | | | |
|---|---|---|---|
| 9,462,271 B2 | 10/2016 | Moriya et al. | |
| 9,462,275 B2 | 10/2016 | Guo et al. | |
| 2012/0140830 A1* | 6/2012 | Xu | H04N 19/176 375/240.18 |
| 2013/0022112 A1 | 1/2013 | Lim et al. | |
| 2013/0107970 A1* | 5/2013 | Wang | H04N 19/176 375/240.18 |
| 2013/0114700 A1 | 5/2013 | Moriya et al. | |
| 2013/0195199 A1* | 8/2013 | Guo | H04N 19/91 375/240.18 |
| 2013/0251026 A1 | 9/2013 | Guo et al. | |
| 2013/0266074 A1 | 10/2013 | Guo et al. | |
| 2014/0192861 A1* | 7/2014 | Chuang | H03M 7/4018 375/240.02 |
| 2015/0312588 A1* | 10/2015 | Yamamoto | H04N 19/105 375/240.15 |
| 2016/0323585 A1 | 11/2016 | Zhai et al. | |

FOREIGN PATENT DOCUMENTS

| | | | |
|---|---|---|---|
| CN | 103024373 A | 4/2013 | |
| CN | 103959785 A | 7/2014 | |
| CN | 104023241 A | 9/2014 | |
| CN | 104081777 A | 10/2014 | |
| EP | 2 230 849 A1 | 9/2010 | |
| EP | 2 575 366 A2 | 4/2013 | |
| RU | 2 413 360 C1 | 2/2011 | |
| WO | 2008/061143 A2 | 5/2008 | |
| WO | 2013/102299 A1 | 7/2013 | |
| WO | WO-2013102299 A1 * | 7/2013 | ........... H04N 19/176 |
| WO | WO 2014/106878 A1 | 7/2014 | |
| WO | 2015/169207 A1 | 11/2015 | |

OTHER PUBLICATIONS

Kim, I.K, et al.; "HM7 High Efficiency Video Coding (HEVC) Test Model 7 Encoder Description;" Joint Collaborative Team on Video Coding (JCT-VC) of ITU-T SG16 WP3 and ISO/IEC JTC1/SC29/WG11; Apr.-May 2012; pp. 1-42.

Gao, ,W., et al.; "Near Lossless Coding for Screen Content;" Joint Collaborative Team on Video Coding (JCT-VC) ot ITU-T SG16 WP3 and ISO/IEC JTC1/SC29/WG11; Jul. 2011; pp. 1-6.

"Block Partitioning Structure for Next Generation Video Coding;" International Telecommunication Union Telecommunication Standardization Sector Study Period; Oct. 2015; pp. 1-8.

* cited by examiner

METHOD OF VIDEO CODING USING SEPARATE CODING TREE FOR LUMA AND CHROMA

CROSS REFERENCE TO RELATED APPLICATIONS

The present invention claims priority to PCT Patent Application, Serial No. PCT/CN2014/090792, filed on Nov. 11, 2014. The PCT Patent Application is hereby incorporated by reference in its entirety.

TECHNICAL FIELD

The present invention relates to video coding. In particular, the present invention relates to coding techniques associated with coding tree design for luma and chroma components.

BACKGROUND

HEVC is an advanced video coding system developed under the Joint Collaborative Team on Video Coding (JCT-VC) group of video coding experts from ITU-T Study Group (High Efficiency Video Coding, Recommendation ITU-T H.265, Series H: Audiovisual And Multimedia Systems, Infrastructure of Audiovisual Services—Coding of Moving Video, International Telecommunication Unit, April, 2013). In HEVC, one slice is first split into multiple coding tree units (CTU) with the same size except in the slice boundary. Each CTU usually has size of 64×64 (i.e., 64×64 luma pixels and the same content region of chroma pixels). Each CTU is further split into multiple coding units (CU) using a quadtree split. For each CU, the CU can be further partitioned into one or more prediction units (PUs) to apply prediction process such as Intra and Inter prediction. The prediction residues associated with each CU are partitioned into one or more transform units (TUs) to apply the transform process such as DCT (discrete cosine transform) or DST (discrete sine transform).

FIG. 1 illustrates an exemplary coding unit partition based on a quadtree. At depth 0, the initial unit 112 consisting of 64×64 pixels corresponds to a CTU. The initial unit 112 is subject to quadtree split as shown in block 110. A split flag 0 indicates that the underlying unit is not split and, on the other hand a split flag 1 indicates the underlying unit is split into four smaller units 122 by the quadtree. The resulting four units are labeled as 0, 1, 2 and 3 and each resulting unit becomes a unit for further split in the next depth. Consequently, at depth 1, the unit 122 is subject to quadtree split as shown in block 120. Again, a split flag 0 indicates the underlying unit is not split and, on the other hand a split flag 1 indicates the underlying unit is split into four smaller units 132 by the quadtree. The unit 132, has a size of 16×16 and the process of the quadtree splitting will continue until all units are leaf units (i.e., split flag=0) or a smallest CU size is reached. Each final leaf unit is called a coding unit (CU). The partition map has to be conveyed to the decoder so that the decoding process can be performed accordingly.

The corresponding coding quadtree syntax specified in the HEVC standard is illustrated by FIG. 2. As shown in FIG. 2, the quadtree splitting syntax according to the HEVC standard does not differentiate between luma and chroma components. In other words, the luma and chroma components share the same quadtree spitting syntax. In FIG. 2, the coding quadtree (210) includes split_cu_flag (220). In step 230, whether split_cu_flag is equal to 1 is tested. If the result is "yes", it implies that the current intermediate unit is split into four smaller units. The four smaller units are subject to further quadtree splitting. Accordingly, four quadtree syntax structures (250, 260, 270 and 280) are included. If the result is "no", it implies that the current unit is not split and this unit is namely CU. Accordingly, this CU is ready for CU coding and syntax for CU level coding (240) is included. As evidenced in FIG. 2, one syntax element split_cu_flag is used to indicate whether the current intermediate unit is further split into four sub-units for both luma and chroma components.

FIG. 3A and FIG. 3B illustrate an example of CTU partitioning using quadtrees. The full-size CTU (310) corresponds to depth 0, which is partitioned into 4 depth-1 intermediate units, labeled as 0, 1, 2 and 3 in FIG. 3A. Among the 4 depth-1 units, depth-1 units at positions 0 (320) and 3 (330) are further partitioned into depth-2 units using the quadtree as shown in FIG. 3A and FIG. 3B. The depth-2 at position 2 (340) is further partitioned into depth-3 units. In FIG. 3B, the circles correspond to intermediate nodes of the tree and dots correspond to leaf nodes. Each leaf node represents a coding unit (CU) to be coded. Each CTU may be partitioned differently to optimize the coding performance. Therefore, the tree structure for each CTU has to be signaled to the decoder to recover the tree structure for each CTU.

The syntax of CU coding (410) according to the HEVC standard is illustrated in FIG. 4. As shown in FIG. 4, various coding information including cu_trans_quant_bypass_flag (420), part_mode_flag (430), pcm_flag (440), intra luma prediction mode (450), intra chroma prediction mode (460), prediction unit parameters (470), and transform tree (480) are included in CU syntax for both luma and chroma.

In Sequence Parameter Set RBSP (SPS) syntax, two syntax elements log 2_min_luma_coding_block_size_minus3 and log 2_diff_max_min_luma_coding_block_size are included to specify the minimum luma CU size and the maximum luma CU quadtree splitting depth. Since the chroma quadtree splitting is tied to the corresponding luma region, the minimum chroma CU size and the maximum chroma CU quadtree splitting depth are implicitly according to these two syntax elements for the luma component.

In Intra chroma prediction, the current chroma prediction block can use the luma prediction mode of the corresponding luma region that covers the same content. Since the CU and prediction unit (PU) partition are shared for luma and chroma, the corresponding luma region (510) has only one luma Intra prediction mode, which can be used as the chroma prediction mode for the current chroma block (520) as shown in FIG. 5.

The texture properties of luma and chroma components are usually different. For example chroma component usually has smoother texture than the luma component. Therefore, forcing luma and chroma to share the same coding quadtree may degrade the coding performance. Accordingly, it is desirable to develop coding techniques to improve the coding efficiency for video data including both luma and chroma data.

SUMMARY

A method of video coding using separate coding trees for video data comprising one luma component and one or more chroma components is disclosed. The luma component and the chroma components are allowed to have its own coding trees to partition the corresponding video data. In one embodiment, a first syntax element is used for each first node of the luma coding tree to indicate whether the first node is split and a separate second syntax element is used for each second node of the chroma coding tree to indicate whether the second node is split. For each CTU, the luma coding tree and the chroma coding tree are signaled using separate syntax elements. Furthermore, for each CTU, the syntax elements for the luma coding tree can be signaled before the syntax elements for the chroma coding tree.

A maximum luma coding-tree splitting depth and a separate maximum chroma coding-tree splitting depth may be used for the separate luma and chroma coding trees. Furthermore, the maximum luma coding-tree splitting depth and the separate maximum chroma coding-tree splitting depth can be signaled in sequence parameter set (SPS), picture parameter set (PPS), or slice header. Additional syntax elements can be signaled in SPS to determine the maximum chroma coding-tree splitting depth.

For each luma coding unit (CU), coding information for the luma component can be signaled. The coding information may correspond to one or more elements selected from a group comprising luma 2N×2N or N×N partition, one or more luma non-square partitions, one or more luma asymmetric partitions, luma Intra prediction mode, luma transform tree, transform split flag, coded block flag, and residuals. The coding information may further comprise luma delta quantization parameter (QP), luma Pulse Code Modulation (PCM) flag, and lumatrans_quant_bypass_flag, where the lumatrans_quant_bypass_flag indicates whether transform and quantization is bypassed for a corresponding luma CU.

For each chroma CU, coding information for the chroma component can also be signaled. The coding information corresponds to one or more elements selected from a group comprising one or more chroma partition types, chroma intra prediction mode, and chroma transform tree. The chroma partition types can be restricted to 2N×2N only and no chroma partition type needs to be signaled in this case. The coding information may further comprise chroma QP, chroma PCM flag, and chromatrans_quant_bypass_flag, where the chromatrans_quant_bypass_flag indicates whether transform and quantization is bypassed for a corresponding chroma CU.

When a chroma PU (prediction unit) determines a chroma prediction mode based on one or more first luma Intra prediction modes of a first corresponding luma region covering a same first content as the chroma PU and the chroma PU is split into one or more chroma TUs (transform units), each chroma TU (transform unit) can use a chroma Intra prediction mode derived from one or more second Intra prediction modes of a second corresponding luma region covering a same second content as each chroma TU. When the second corresponding luma region has more than one second luma Intra prediction modes, the chroma Intra prediction mode for each chroma TU can be determined based on all second luma Intra prediction modes, or some selected luma Intra prediction modes from some selected positions of the second corresponding luma region.

The use of separate luma coding tree and chroma coding tree can be applied only for CTUs in the I-slice, and the same luma coding tree and chroma coding tree can be applied for CTUs in the B-slice and the P-slice. In another embodiment, the use of separate luma coding tree and chroma coding tree can be applied for CTUs in the I-slice, B-slice and P-slice. When the luma CU and the chroma CU are within one CTU in the B-slice or the P-slice, separate motion information is used for a luma CU (coding) and a chroma CU.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

In order to allow exploiting different characteristics of different color components, embodiments of the present invention allow using separate coding trees for luma and chroma components.

In the first embodiment, separate coding-unit split flags are used to indicate whether the current units of respective color components are further split into four sub-units for the luma and chroma component. For example, two separate syntax elements split_luma_cu_flag and split_chroma_cu_flag, instead of one shared split_cu_flag, can be used to indicate the coding quadtree splitting for luma and chroma components respectively. An example of the coding quadtree for luma and chroma components is shown in FIG.

Figure 1:
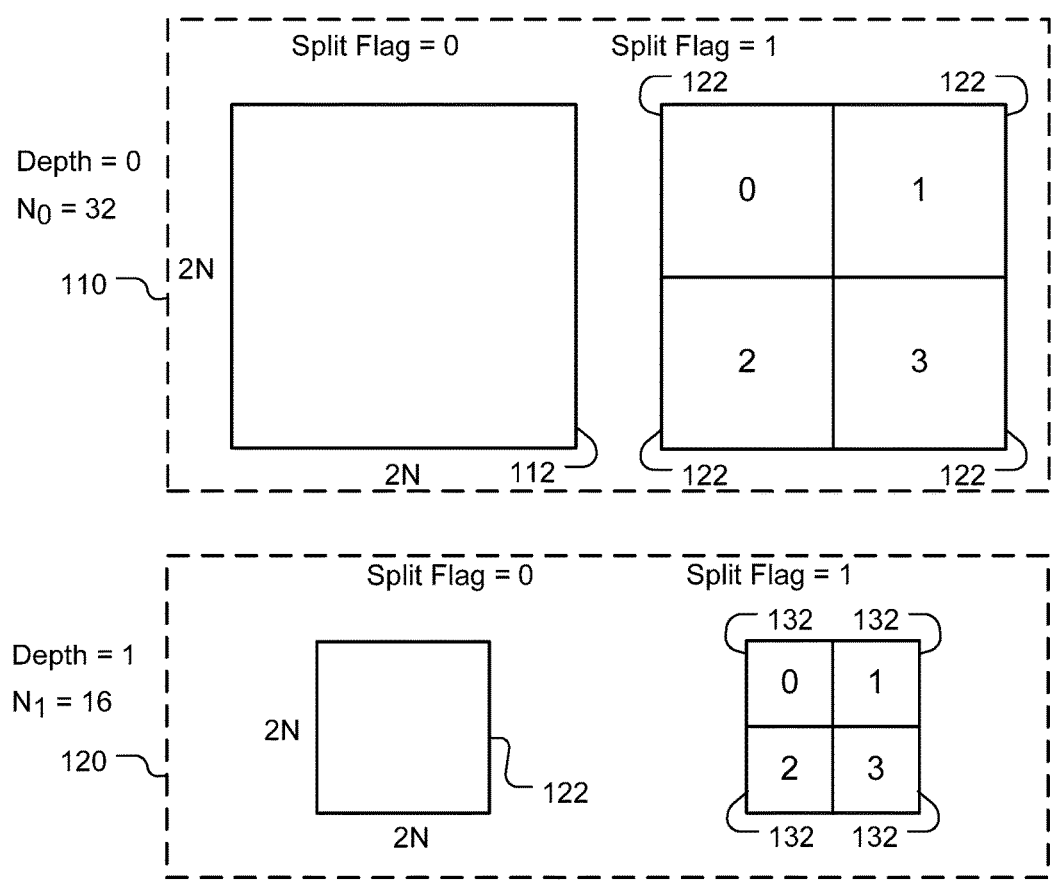
FIG. 1 illustrated an example of CTU (coding tree unit) partitioning using a quadtree according to the HEVC (high efficiency video coding) standard.
Figure 2:
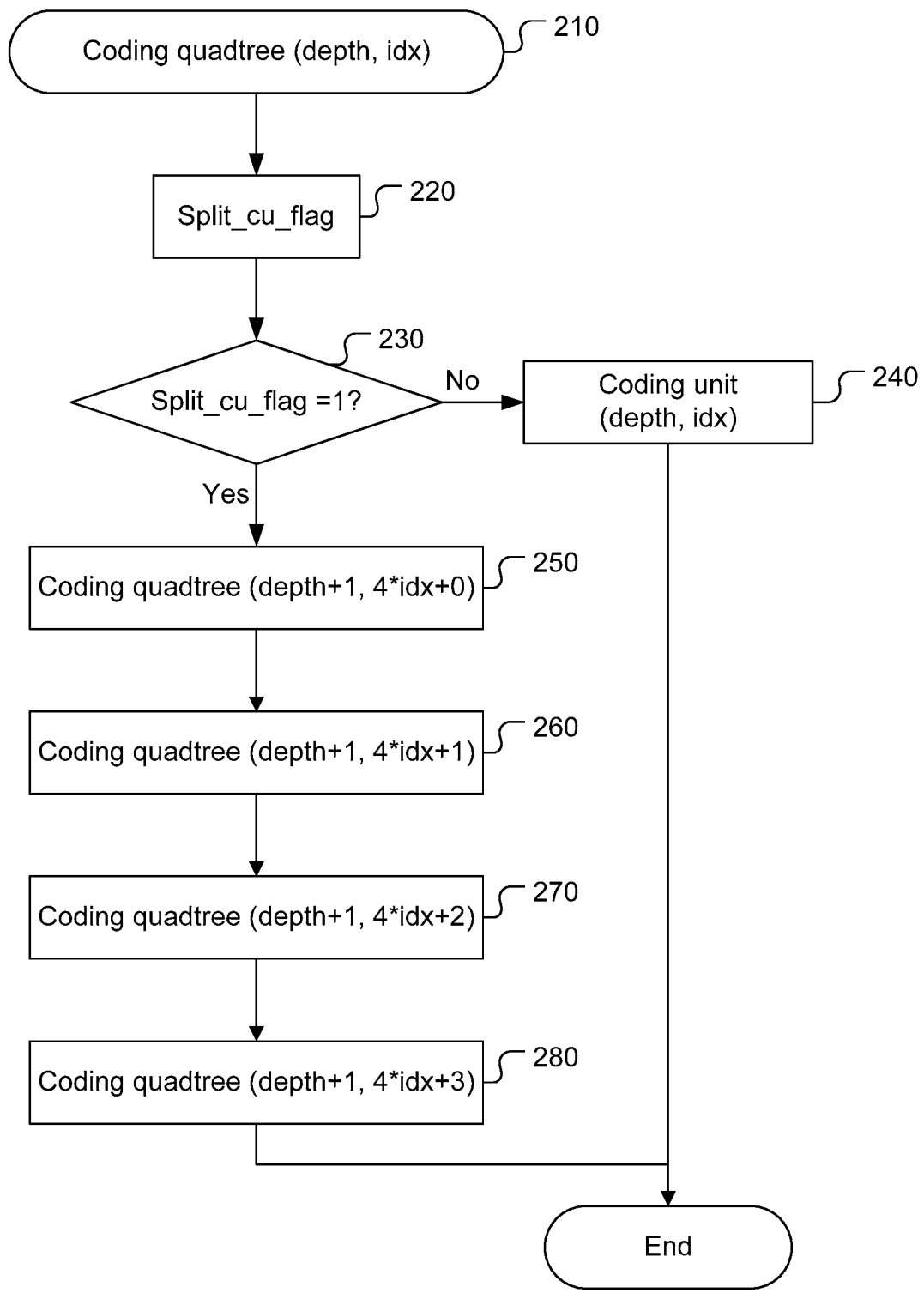
FIG. 2 illustrates an exemplary flowchart of the coding quadtree process for the CU (coding unit) according to the HEVC (high efficiency video coding) standard.
Figure 3A:
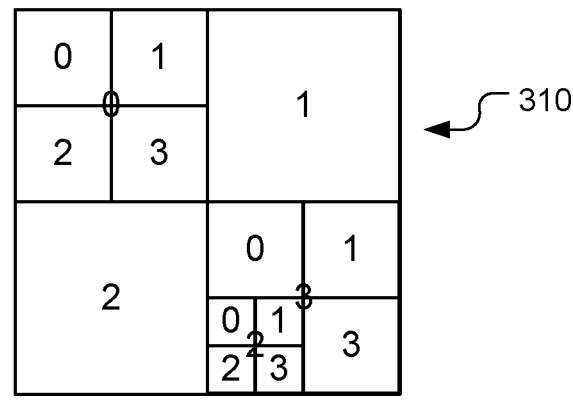
FIG. 3A illustrates an exemplary result of a CTU (coding tree unit) partitioned using a quadtree into leaf CUs (coding units).
Figure 3B:
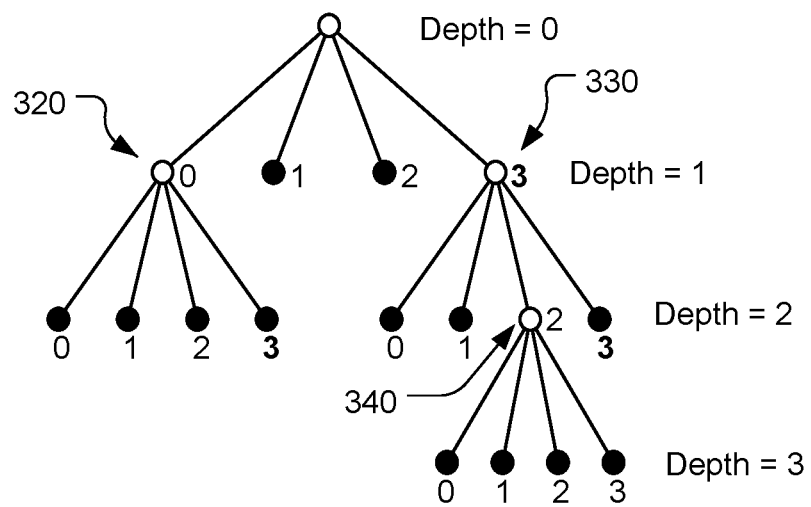
FIG. 3B illustrates a coding tree corresponding to the CTU partition in FIG. 3A.
Figure 6:
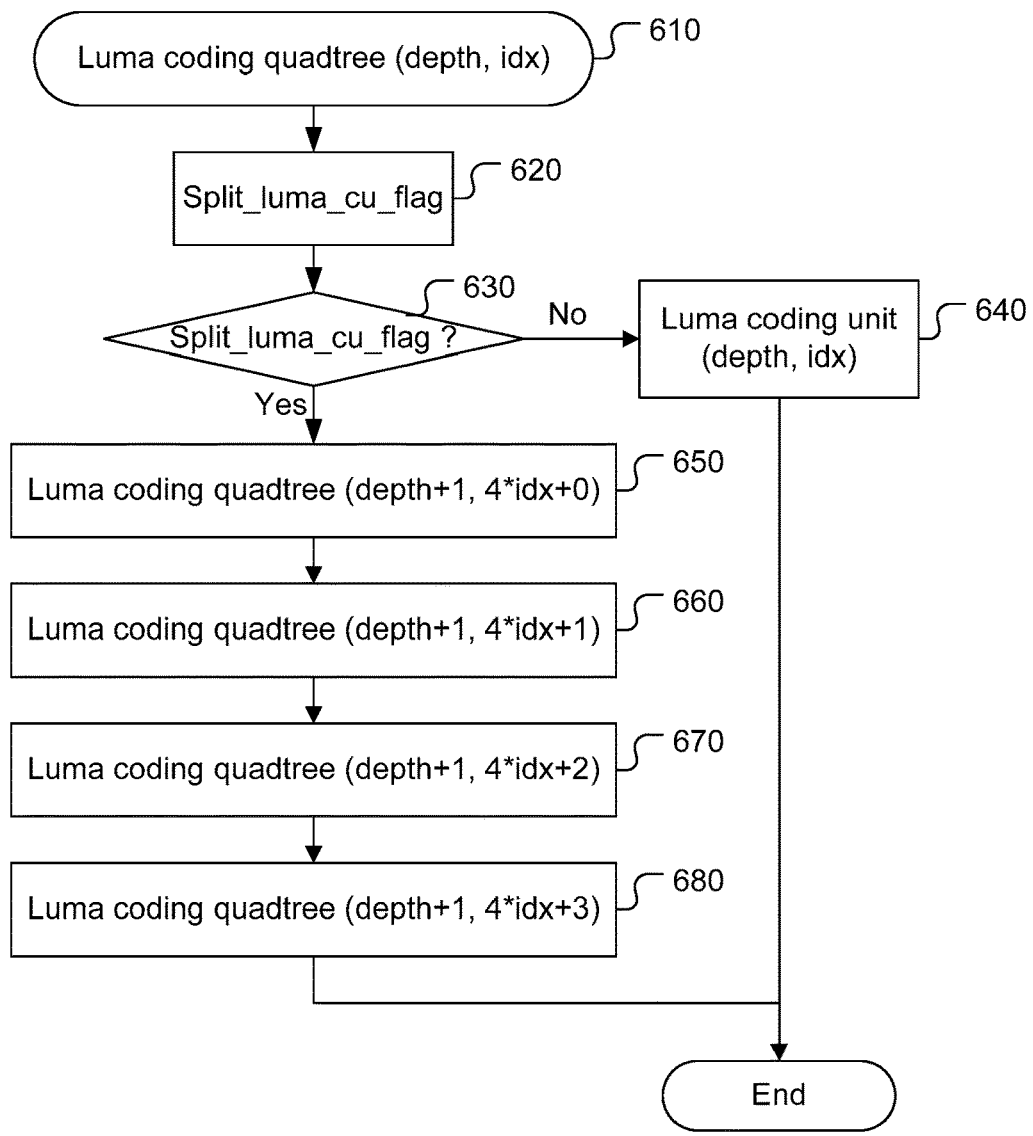
FIG. 6 illustrates an exemplary flowchart of the luma coding quadtree process for the luma CU (coding unit) according to an embodiment of the present invention.
Figure 7:
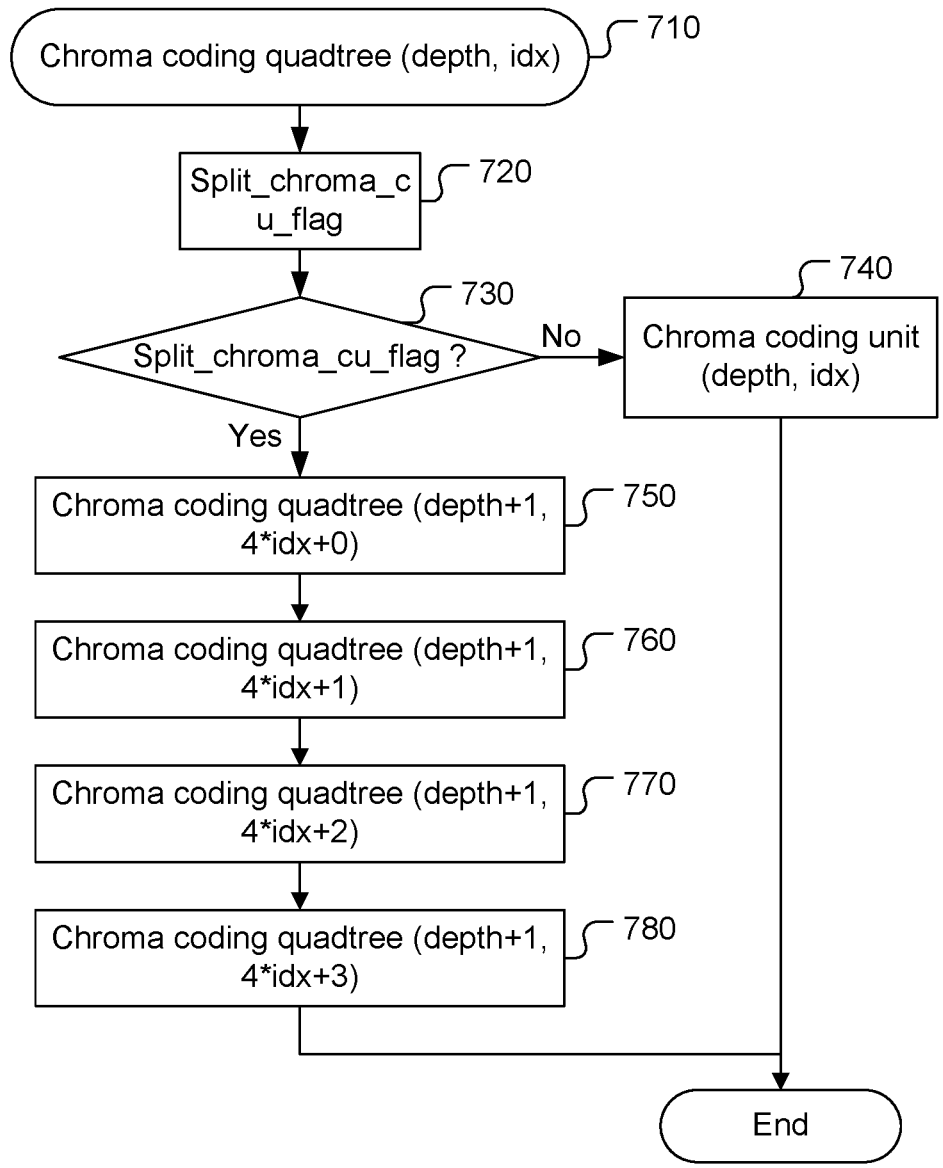
FIG. 7 illustrates an exemplary flowchart of the chroma coding quadtree process for the chroma CU (coding unit) according to an embodiment of the present invention.

6 and FIG. 7 respectively. In FIG. 6, the CU quadtree splitting syntax for the luma component according to this embodiment is similar to the CU quadtree splitting for shared luma/chroma components in FIG. 2. In FIG. 6, the luma coding quadtree (610) includes split_luma_cu_flag (620). In step 630, whether split_luma_cu_flag is equal to 1 is tested. If the result is "yes", it implies that the current luma intermediate unit is split into four smaller luma units. The four smaller luma units are subject to further quadtree splitting. Accordingly, four quadtree syntax structures (650, 660, 670 and 680) are included. If the result is "no", it implies that the current luma unit is not split, then this luma unit is namely luma CU. Accordingly, this luma CU is ready for CU coding and syntax for CU level coding (640) is included. In FIG. 7, the chroma coding quadtree (710) includes split_chroma_cu_flag (720). In step 730, whether split_chroma_cu_flag is equal to 1 is tested. If the result is "yes", it implies that the current chroma intermediate unit is split into four smaller chroma units. The four smaller chroma units are subject to further quadtree splitting. Accordingly, four quadtree syntax structures (750, 760, 770 and 780) are included. If the result is "no", it implies that the current chroma unit is not split, then this chroma unit is namely chroma CU. Accordingly, this chroma CU is ready for CU coding and syntax for CU level coding (740) is included. While an example of separate coding quadtrees is shown in FIG. 6 and FIG. 7, other separate coding trees (such as binary tree) may also be used to practice the present invention.

Figure 4:
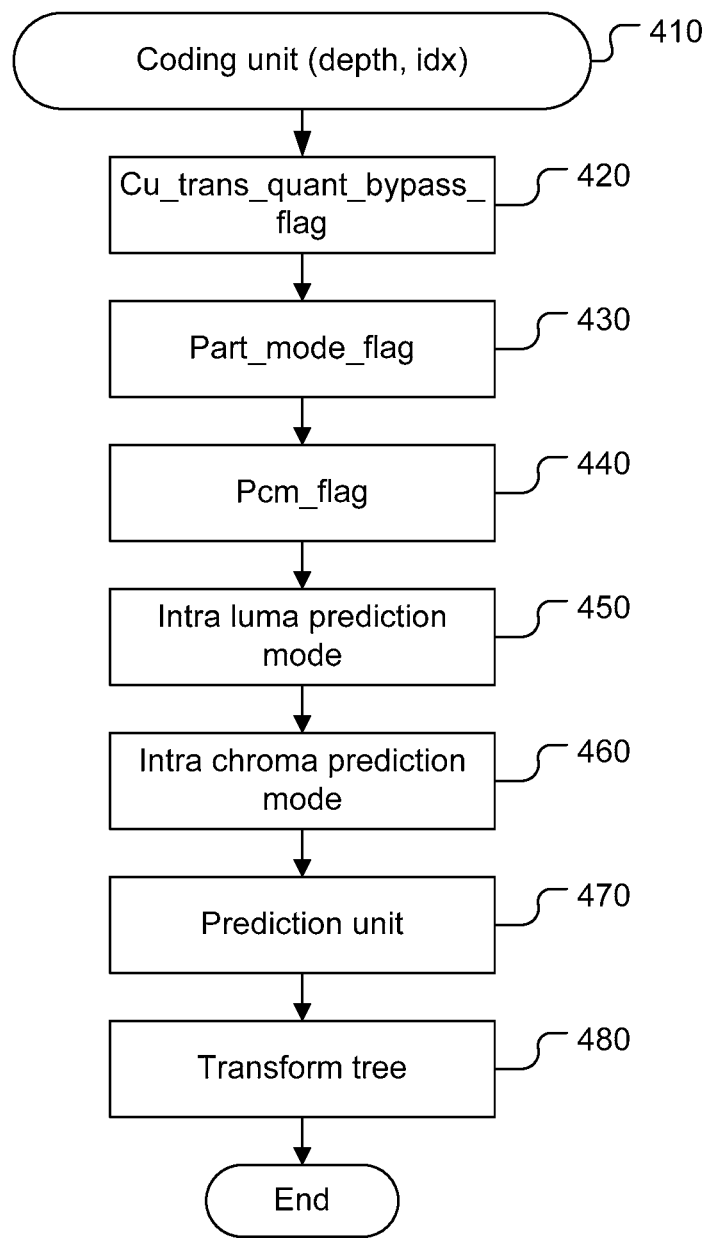
FIG. 4 illustrates an example of coding process including parsing syntax elements for a coding unit (CU) according to the HEVC (high efficiency video coding) standard.
Figure 5:
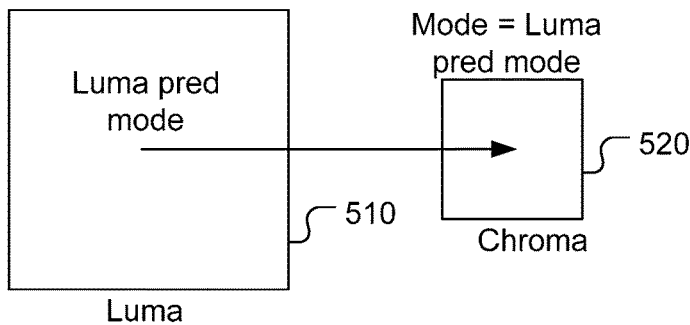
FIG. 5 illustrates the case that the chroma Intra prediction mode for a chroma block is based on the luma prediction mode of a corresponding luma region covering the same content according to the HEVC (high efficiency video coding) standard.
Figure 8:
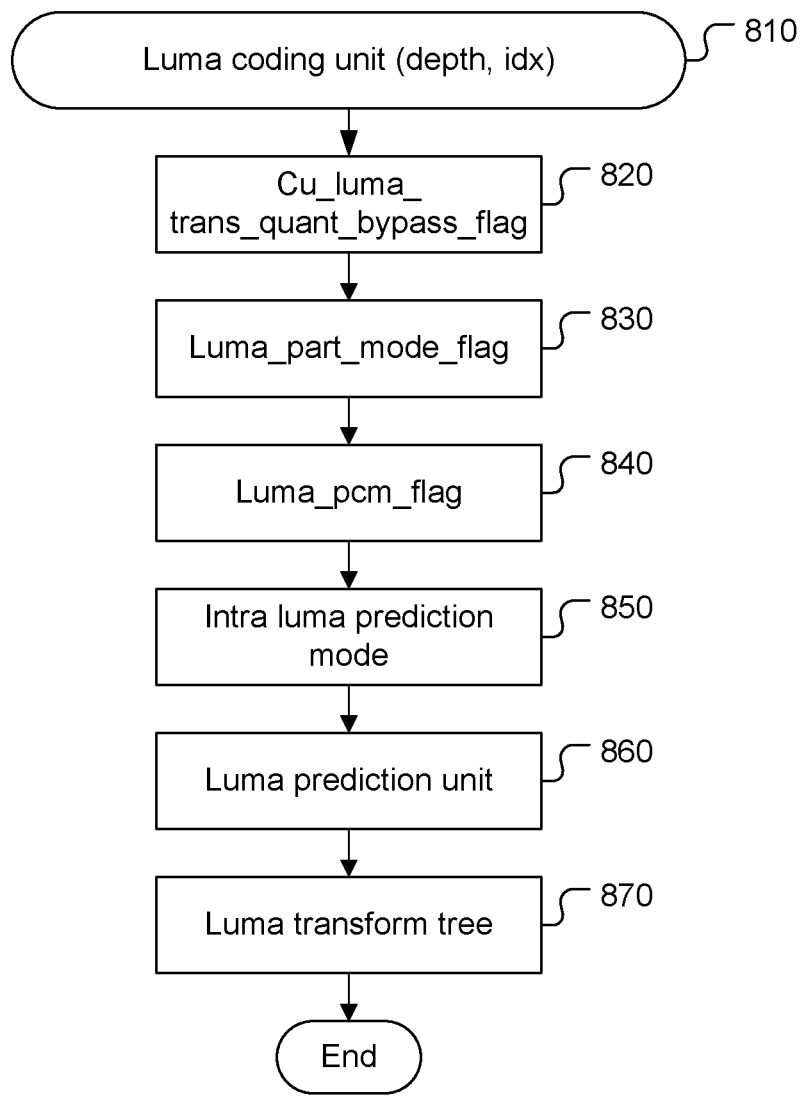
FIG. 8 illustrates an example of coding process including parsing syntax elements for a luma coding unit (CU) according to an embodiment of the present invention.
Figure 9:
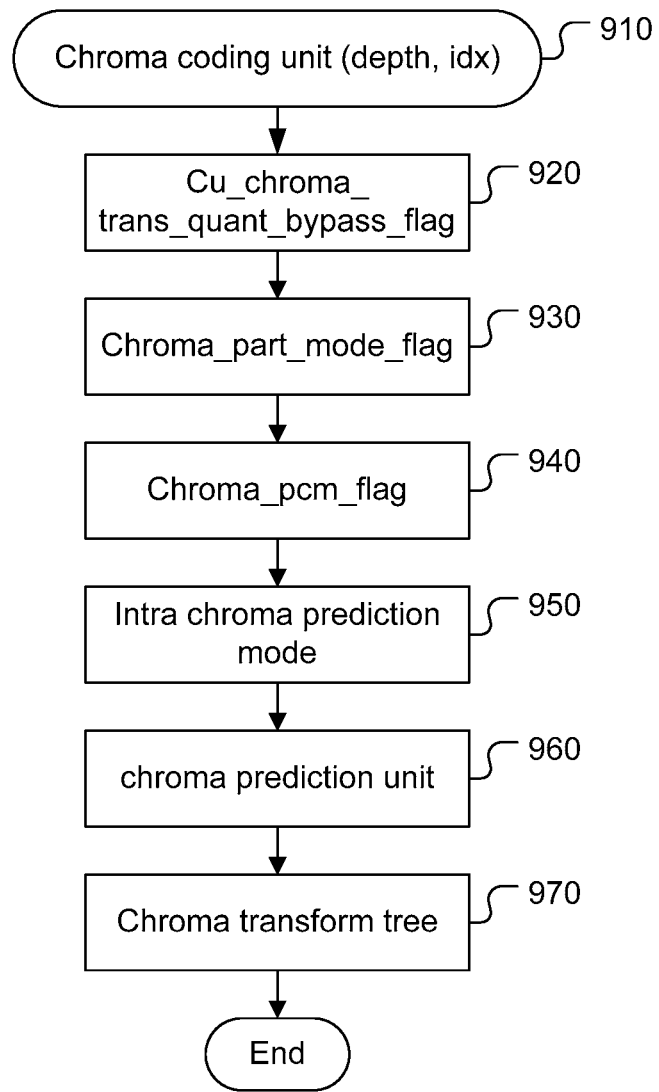
FIG. 9 illustrates an example of coding process including parsing syntax elements for a chroma coding unit (CU) according to an embodiment of the present invention.

According to the present invention, the coding quadtree for the luma and chroma components are signaled separately in each CTU. Furthermore, the luma coding quadtree can be signaled before the chroma coding quadtree. An example of the luma CU coding and syntax structure and chroma CU coding and syntax structure are shown in FIG. 8 and FIG. 9 respectively. FIG. 8 illustrates the luma CU syntax (810), which is similar to the joint luma/chroma CU syntax in FIG. 4 for both the luma and chroma components except that FIG. 8 does not includes any syntax element for the chroma component (i.e., without Intra chroma prediction mode). As shown in FIG. 8, various coding information including cu_luma_trans_quant_bypass_flag (820), lumapart_mode_flag (830), lumapcm_flag (840), intra luma prediction mode (850), luma prediction unit parameters (860), and luma transform tree (870) are included in CU syntax for the luma component. FIG. 9 illustrates an example of chroma CU syntax that does not include any syntax related to the luma component. As shown in FIG. 9, various coding information including cu_chroma_trans_quant_bypass_flag (920), chromapart_mode_flag (930), chromapcm_flag (940), intra chroma prediction mode (950), chroma prediction unit parameters (960), and chroma transform tree (970) are included in CU syntax for the chroma component. While an example of separate CU syntax is shown in FIG. 8 and FIG. 9, other separate CU syntax may also be used to practice the present invention.

According to the existing HEVC standard, the maximum coding quadtree splitting depth is signaled and shared by both the luma and chroma components. For embodiments of the present invention, the maximum coding quadtree splitting depth for the luma and chroma components can be separate. Furthermore, the maximum coding quadtree splitting depth can be defined in high-level syntax such as SPS (sequence parameter set), PPS (picture parameter set), or slice header. For example, the luma component can use the original syntax for the maximum luma coding quadtree splitting depth while two additional syntax elements, log 2_min_chroma_coding_block_size_minus2 and log 2_diff_max_min_chroma_coding_block_size can be signaled in SPS for the chroma component. Syntax element, log 2_min_chroma_coding_block_size_minus2 specifies the minimum chroma CU size minus 2 and syntax element, log 2_diff_max_min_chroma_coding_block_size specifies the difference between the maximum chroma CU size and the minimum chroma CU size. Therefore, the maximum chroma coding quadtree splitting depth can be determined from these two additional syntax elements.

Furthermore, according to another embodiment of the present invention, coding information for the luma component can be signaled in the luma CU, where the luma coding information may include luma partition type (e.g. 2N×2N, N×N, non-square partitions, or asymmetric partitions), luma Intra prediction mode, and luma transform tree (transform split flag, coded block flag, and residuals).

Similarly, coding information for the chroma component can be signaled in the chroma CU, where the chroma coding information may include chroma partition type, chroma Intra prediction mode, and chroma transform tree. Since the chroma texture is usually simpler than luma, only one partition type such as 2N×2N can be used for chroma according to one embodiment. Therefore, there is no need to signal the chroma partition type in this case.

The delta QP (quantization parameter) can also be separate for the luma and chroma components according to one embodiment. Therefore, the delta QP for the luma component is signaled in the luma CU and the delta QP for the chroma component is signaled in the chroma CU.

The Pulse Code Modulation (PCM) mode and the syntax element, trans_quant_bypass_flag can also be separate for the luma and chroma components according to one embodiment of the present invention. Therefore, the luma PCM flag can be signaled in the luma CU to indicate whether the luma PCM samples are present, and the syntax element, cu_luma_trans_quant_bypass_flag can be signaled in the luma CU to indicate whether the transform and quantization processes are bypassed for the luma component. Similarly, the chroma PCM flag can be signaled in the chroma CU to indicate whether the chroma PCM samples are present, and the syntax element, cu_chroma_trans_quant_bypass_flag can be signaled in the chroma CU to indicate whether the transform and quantization processes are bypassed for chroma.

Figure 10:
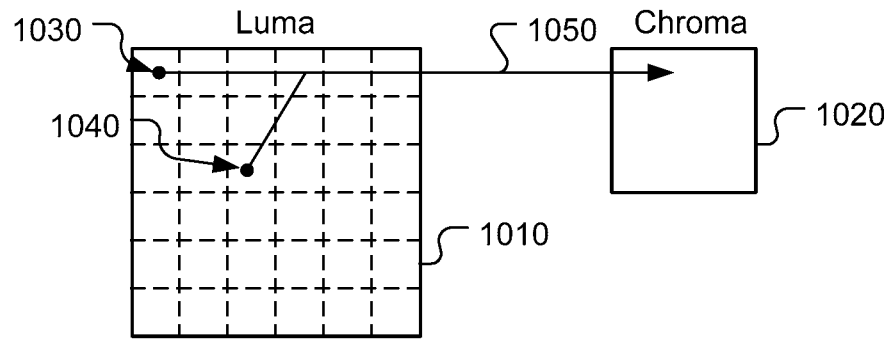
FIG. 10 illustrates an example of the chroma PU using the luma prediction mode of the corresponding luma region that covers the same content when the PU is not split into multiple TUs according to an embodiment of the present invention.
Figure 11:
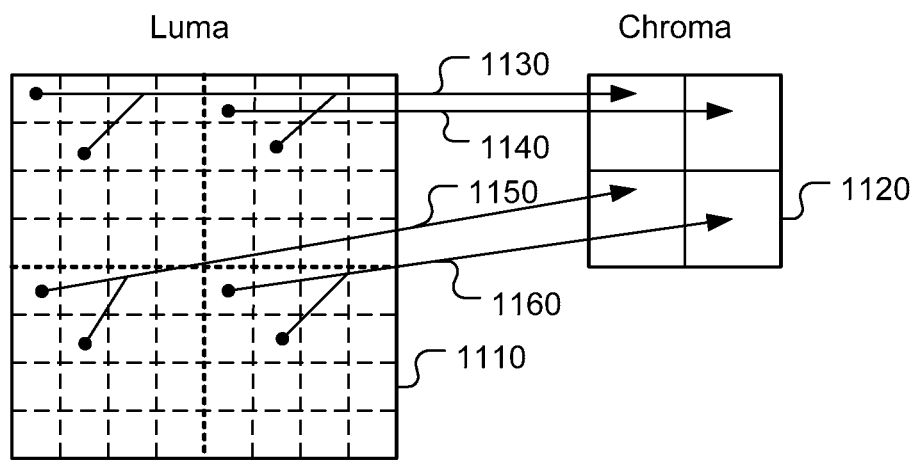
FIG. 11 illustrates an example of the chroma PU using the luma prediction mode of the corresponding luma region that covers the same content when the PU is split into multiple TUs according to an embodiment of the present invention.

When the chroma PU (prediction unit) uses the luma Intra prediction modes of the corresponding luma region that covers the same content and the chroma PU is split into one or more transform units (TUs), each chroma TU uses the Intra prediction mode of its corresponding luma region. Since the corresponding luma region may have more than one luma Intra prediction modes, all the modes or the mode in one or more specific positions can be used as candidate(s) for the current chroma TU. For example, the Intra prediction mode in top-left position and center positions can be used as candidates for the current chroma TU as shown in FIG. 10 and FIG. 11. FIG. 10 illustrates a case where the chroma PU has only one chroma TU (1020). The corresponding luma region (1010) covering the same content of the chroma PU may have one or more Intra prediction modes. The luma Intra prediction mode for the top-left position (1030) and the center position (1040) can be used as candidates to determine the chroma Intra prediction mode (1050) for the current chroma TU. FIG. 11 illustrates a case where the chroma PU has four chroma TUs (1120) and the corresponding luma region (1110) covering the same content of the chroma PU may have one or more Intra prediction modes.

For each chroma TU, the luma Intra prediction mode for the top-left position and the center position of a corresponding luma region covering the same content can be used as candidates to determine the chroma Intra prediction mode for each chroma TU. Accordingly, 4 chroma Intra prediction modes (1130, 1140, 1150 and 1160) are derived for the 4 chroma TUs. The center position in the above examples refers to the upper-left block of the center point of the PU. However, other center position, such as lower-right block may also be used as the center position.

In another embodiment, the separate coding quadtrees for the luma and chroma components can be applied to I slices only. For the P and B slices, a unified coding quadtree is still shared by the luma and chroma components. The separate coding quadtrees for the luma and chroma components may also be applied to all types of slices (i.e., I, P, and B). When the separate coding quadtrees for the luma and chroma components is applied to the P and B slices, the motion information for CUs can be separate for the luma and chroma components according to another embodiment of the present invention. In yet another embodiment, separate chroma coding quadtrees can be used for different chroma components (e. g. U and V).

Figure 12:
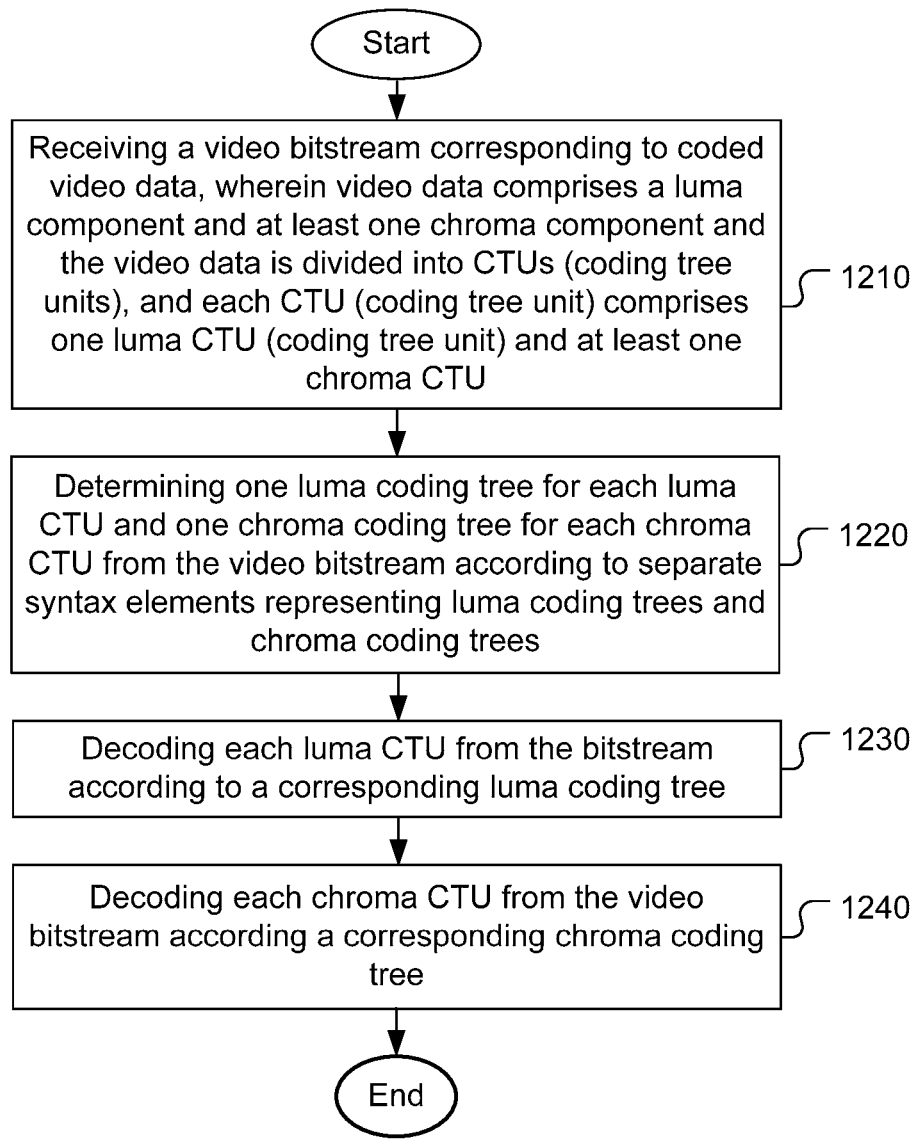
FIG. 12 illustrates an exemplary flowchart for a coding system using separate luma and chroma coding trees incorporating an embodiment of the present invention.

FIG. 12 illustrates an exemplary flowchart for a decoding system using separate luma and chroma coding trees incorporating an embodiment of the present invention. The system receives a video bitstream corresponding to coded video data, where the video data comprises a luma component and one or more chroma components and the video data is divided into CTUs (coding tree units), and each CTU (coding tree unit) comprises both luma and chroma components as shown in step 1210. The video bitstream may be retrieved from storage such as a computer memory of buffer (RAM or DRAM). The video bitstream may also be received from a processor such as a processing unit or a digital signal. One luma coding tree for each luma CTU and one chroma coding tree for each chroma CTU are determined from the video bitstream according to separate syntax elements representing luma coding trees and chroma coding trees respectively as shown in step 1220. Each luma CTU is decoded from the bitstream according to a corresponding luma coding tree in step 1230. Each chroma CTU is decoded from the video bitstream according a corresponding chroma coding tree in step 1240.

The flowchart shown above is intended to illustrate examples of video coding incorporating an embodiment of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video decoding, the method comprising:
   receiving a video bitstream corresponding to coded video data, wherein video data comprises a luma component and one or more chroma components and the video data is divided into CTUs (coding tree units), and each CTU (coding tree unit) comprises one luma CTU (coding tree unit) and one or more chroma CTUs (coding tree units);
   determining one luma coding tree for each luma CTU and one chroma coding tree for each chroma CTU from the video bitstream according to separate syntax elements representing luma coding trees and chroma coding trees respectively, wherein the separate syntax elements representing luma coding trees and chroma coding trees are parsed from the video bitstream for each luma CTU and each chroma CTU only in an I-slice, and shared syntax elements are parsed from the video bitstream for each luma CTU and each chroma CTU in a B-slice or a P-slice;
   decoding each luma CTU from the video bitstream according to a corresponding luma coding tree for performing a luma CU decoding on each luma CU partitioned from a corresponding luma CTU; and
   decoding each chroma CTU from the video bitstream according a corresponding chroma coding tree for performing a chroma CU decoding on each chroma CU partitioned from a corresponding chroma CTU.

2. The method of claim 1, wherein a syntax element is parsed for each node of each luma coding tree to indicate whether each node is split and a separate syntax element is parsed for each node of each chroma coding tree to indicate whether each node is split.

3. The method of claim 1, wherein for each CTU, first syntax elements for each luma CTU are parsed before second syntax elements for each chroma CTU.

4. The method of claim 1, wherein a maximum luma coding-tree splitting depth for the luma component and a separate maximum chroma coding-tree splitting depth for the chroma component are parsed from the video bitstream.

5. The method of claim 4, wherein the maximum luma coding-tree splitting depth and the separate maximum chroma coding-tree splitting depth are parsed from sequence parameter set (SPS), picture parameter set (PPS), or slice header.

6. The method as claimed in claim 4, wherein a first additional syntax element and a second additional syntax element are parsed from sequence parameter set (SPS) to determine the separate maximum chroma coding-tree splitting depth, wherein the first additional syntax element specifies a minimum chroma coding unit (CU) size and the second additional syntax element specifies a difference between a maximum chroma CU size and the minimum chroma CU size.

7. The method of claim 1, wherein for each luma coding unit (CU), coding information for the luma component is parsed, wherein the coding information corresponds to one or more elements selected from a group comprising luma 2N×2N partition, luma N×N partition, one or more luma non-square partitions, one or more luma asymmetric partitions, luma Intra prediction mode, luma transform tree, transform split flag, coded block flag, and residuals.

8. The method of claim 7, wherein the coding information further comprises luma delta quantization parameter (QP), luma Pulse Code Modulation (PCM) flag, and lumatrans_quant_bypass_flag, wherein the lumatrans_quant_bypass_flag indicates whether transform and quantization is bypassed for a corresponding luma CU.

9. The method of claim 1, wherein for each chroma coding unit (CU), coding information for the chroma component is parsed, wherein the coding information corresponds to one or more elements selected from a group comprising one or more chroma partition types, chroma intra prediction mode, and chroma transform tree.

10. The method of claim 9, wherein only 2N×2N chroma partition among said one or more chroma partition types is allowed for the chroma component and no chroma partition type is parsed for each chroma CU.

11. The method of claim 9, wherein the coding information further comprises chroma quantization parameter (QP), chroma Pulse Code Modulation (PCM) flag, and chromatrans_quant_bypass flag, wherein the chromatrans_quant_bypass_flag indicates whether transform and quantization is bypassed for a corresponding chroma CU.

12. The method of claim 1, wherein when a chroma PU (prediction unit) determines a chroma Intra prediction mode based on one or more first luma Intra prediction modes of a first corresponding luma region covering a same first content as the chroma PU and the chroma PU is split into one or more chroma TUs (transform units), each chroma TU (transform unit) uses a chroma Intra prediction mode derived from one or more second Intra prediction modes of a second corresponding luma region covering a same second content as each chroma TU.

13. The method of claim 12, wherein when the second corresponding luma region has more than one second luma Intra prediction modes, the chroma Intra prediction mode for each chroma TU is determined based on all of said more than one second luma Intra prediction modes, or one or more selected luma Intra prediction modes from one or more selected positions of the second corresponding luma region.

14. A method of video encoding, the method comprising:
receiving video data comprising a luma component and one or more chroma components;
dividing the video data into CTUs (coding tree units), where each CTU (coding tree unit) comprises one luma CTU (coding tree unit) and one or more chroma CTU (coding tree units);
partitioning each luma CTU into one or more luma CUs (coding units) according to one luma coding tree for each luma CTU, and partitioning each chroma CTU into one or more chroma CUs according to one chroma coding tree for each chroma CTU;
signaling separate syntax elements to represent luma coding trees and chroma coding trees respectively, wherein the separate syntax elements representing luma coding trees and chroma coding trees are signaled in the video bitstream for each luma CTU and each chroma CTU only in an I-slice, and shared syntax elements are signaled in the video bitstream for each luma CTU and each chroma CTU in a B-slice or a P-slice;
encoding each luma CTU according to a corresponding luma coding tree for performing a luma CU encoding on each luma CU partitioned from a corresponding luma CTU; and
encoding each chroma CTU according a corresponding chroma coding tree for performing a chroma CU encoding on each chroma CU partitioned from a corresponding chroma CTU.

15. The method of claim 14, wherein a syntax element is signaled for each first node of each luma coding tree to indicate whether each node is split and a separate syntax element is signaled for each node of each chroma coding tree to indicate whether each node is split.

16. The method of claim 14, wherein for each CTU, first syntax elements for each luma CTU are signaled before second syntax elements for each chroma CTU.

17. The method of claim 14, wherein a maximum luma coding-tree splitting depth for the luma component and a separate maximum chroma coding-tree splitting depth for the chroma component are signaled in a video bitstream.

* * * * *